(12) United States Patent
Shivkumar et al.

(10) Patent No.: US 12,497,558 B2
(45) Date of Patent: Dec. 16, 2025

(54) COLOUR CHANGE COMPOSITION AND COMPOUNDS

(71) Applicant: Thermographic Measurements Ltd., Honiton (GB)

(72) Inventors: Bagavant Shivkumar, South Wirrel (GB); Uma Shivkumar, South Wirrel (GB); Philippe Marrec, Lannion (FR)

(73) Assignee: THERMOGRAPHIC MEASUREMENTS LTD, Honiton (GB)

( * ) Notice: Subject to any disclaimer, the term of this patent is extended or adjusted under 35 U.S.C. 154(b) by 935 days.

(21) Appl. No.: 17/631,764

(22) PCT Filed: Jul. 31, 2020

(86) PCT No.: PCT/EP2020/071663
§ 371 (c)(1),
(2) Date: Jan. 31, 2022

(87) PCT Pub. No.: WO2021/019074
PCT Pub. Date: Feb. 4, 2021

(65) Prior Publication Data
US 2022/0275272 A1    Sep. 1, 2022

(30) Foreign Application Priority Data
Jul. 31, 2019    (GB) .................................... 1910904

(51) Int. Cl.
*C09D 11/00* (2014.01)
*C07C 43/188* (2006.01)
(Continued)

(52) U.S. Cl.
CPC .............. *C09K 9/02* (2013.01); *C07C 43/188* (2013.01); *C09B 57/00* (2013.01);
(Continued)

(58) Field of Classification Search
CPC ... C09K 9/02; C09K 2211/1011; C09D 11/17; C09D 11/50; C07C 43/188; C09B 57/00; C09B 67/0097; G01K 11/16
(Continued)

(56) References Cited

U.S. PATENT DOCUMENTS 6,281,245 B1    8/2001    Patel et al.
8,277,696 B2   10/2012    Ono
(Continued)

FOREIGN PATENT DOCUMENTS

WO    WO-2013146437 A1 * 10/2013    ........... C07C 233/09

OTHER PUBLICATIONS

UK Search Report for Great Britain Application No. GB1910904.0 dated Feb. 25, 2020.
(Continued)

*Primary Examiner* — James E Mcdonough
(74) *Attorney, Agent, or Firm* — Dority & Manning, P.A.

(57) ABSTRACT

The invention provides a colour change composition containing an electron donating organic colouring compound, an electron accepting compound and a compound of formula (I): wherein E is an ester linkage O—CO or —CO2, R is independently selected from an optionally substituted linear or branched alkyl group, alkenyl cycloalkyl group, alkenyl group, alkoxy group, aryl and alkylene aryl group having from 6 to 22 carbon atoms; $Y_1$ $Y_2$ $X_1$ and X2 are independently selected from hydrogen, R', —OR' and halogen; wherein R' is independently selected from an optionally substituted linear or branched alkyl group, alkenyl group, alkoxy group, aryl group and an alkylene aryl group; having from 5 to 22 carbon atoms; r and p each represent and integer from 0 to 3. The compound of formula (I) and compositions of the invention are useful in providing a colour change
(Continued)

effect, in memory compositions and visual indicators, particularly in security and healthcare applications.

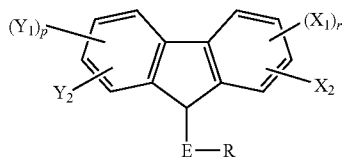

(I)

24 Claims, 3 Drawing Sheets

(51) Int. Cl.
    *C09B 57/00*     (2006.01)
    *C09B 67/02*     (2006.01)
    *C09D 11/17*     (2014.01)
    *C09D 11/50*     (2014.01)
    *C09K 9/02*     (2006.01)
    *G01K 11/16*     (2021.01)

(52) U.S. Cl.
    CPC .......... *C09B 67/0097* (2013.01); *C09D 11/17* (2013.01); *C09D 11/50* (2013.01); *G01K 11/16* (2013.01); *C09K 2211/1011* (2013.01)

(58) Field of Classification Search
    USPC ................................ 106/31.01, 31.13, 31.35
    See application file for complete search history.

(56) References Cited

U.S. PATENT DOCUMENTS

| | | | |
|---|---|---|---|
| 8,962,522 B2 | 2/2015 | Ono | |
| 11,225,577 B2 | 1/2022 | Shivkumar et al. | |
| 2016/0130455 A1 | 5/2016 | Ono | |
| 2017/0050460 A1* | 2/2017 | Ono | ................... C09B 67/0097 |

OTHER PUBLICATIONS

International Preliminary Report on Patentability dated Feb. 1, 2022, for International Application No. PCT/EP2020/071663.
International Search Report and Written Opinion of the International Searching Authority mailed Dec. 22, 2020 for International Application No. PCT/EP2020/071663.
Takao Kimura et al., "Study on Radical Telomerization of Esters of Methacrylic Acid Using Bromotrichloromethane and Characteristics of the Resulting Telomers V. Fluorenyl Methacrylates", Polymer Journal, Oct. 1, 1987, vol. 60, No. 10, pp. 1165-1172.
Barbara Zajc et al., "Acyl Migration in Anions Derived from Nonenolizable Esters of Polycyclic Aromatic Hydrocarbons", Journal of Organic Chemistry, Jul. 1, 1995, vol. 60, No. 15, pp. 4936-4939.
Mauro Marigo et al., "Direct Catalytic Asymmetric Mannich Reactions of Malonates and B-Keto Esters", Chemistry a European Journal, May 23, 2003, vol. 9, No. 10, pp. 2359-2367.
UK Examination Report for Great Britain Application No. GB2011927.7 dated Jan. 13, 2023.
UK Search Report for Great Britain Application No. GB2011927.7 dated Jan. 27, 2021.

* cited by examiner

Key

- white
- blue
- purple
- magenta

COLOUR CHANGE COMPOSITION AND COMPOUNDS

CROSS-REFERENCE TO RELATED APPLICATIONS

This is a U.S. National Stage of International PCT Application No. PCT/EP2020/071663, filed Jul. 31, 2020, which claims the benefit of priority to Great Britain Application No. 1910904.0, filed Jul. 31, 2019, the disclosures of which are hereby incorporated by reference in their entireties.

FIELD OF THE INVENTION

This invention relates to a colour change composition, a microencapsulated pigment comprising the colour change composition and an article comprising the said composition or microencapsulated pigment and to novel compounds suitable for use in such compositions.

In particular, the invention relates to thermochromic compositions and compounds Colour change compositions are widely known and change between a discoloured state and coloured state colour or between a first and second coloured state with a change in external stimulus, for example light, temperature, electric current and pressure. In this specification, reference will be made to change between a discoloured and coloured state for convenience but this also encompasses a change between a first coloured state and a second coloured state. Colour change compositions typically comprise an electron-donating colour-developing organic compound or leuco dye, an electron-accepting compound or colour developer and a compound acting as a reaction medium for reversible electron exchange between the electron-accepting and electron-donating compounds or colour change regulator. The components of the composition are typically micronized or enclosed in microcapsules and may be formulated to produce an ink composition. The composition may be employed in any applications in which temperature dependent colour-change is required or desirable for example in toys, printed materials, decoration, writing instruments, temperature indicators in packaging of medical products such as vaccines and in a wide range of industrial applications such as in curing or bonding processes, pipes, measurement of surface temperature, indication of overheating for example of machinery, pipes or the like.

Colour change compositions reversibly change colour or change between a coloured and discoloured state when subjected to an external stimulus, for example a change in temperature, of a sufficient magnitude. Typically, with a thermochromic composition, an increase in temperature will lead to the ink having a discoloured state while cooling will lead to reappearance of colour. As temperature increases, the thermochromic composition will retain colour until the temperature reaches a maximum temperature for retention of the complete coloured state, known as the "maximum colour-retaining temperature" or $T_3$ as shown in FIG. 1 of the accompanying drawings. The composition will then become progressively discoloured as the temperature increases until it reaches a completely discoloured state at a temperature known as the "complete discolouring temperature" or $T_4$, the minimum temperature for achieving the completely discoloured state. The mean temperature between $T_3$ and $T_4$ is known as $T_G$.

As the thermochromic composition cools from a discoloured state, the composition remains discoloured until a temperature is reached below which colour reappears, known as the "minimum discoloured state retaining temperature) or $T_2$ as the temperature decreases, colour reappears fully at a temperature known as the "complete colouring temperature" or $T_1$. The mean temperature between $T_1$ and $T_2$ is referred to as $T_H$. The thermochromic composition has a hysteresis width, known as $\Delta H$ which is the temperature difference between $T_H$ and $T_G$.

As the composition is subject to heating or cooling, the coloured state or discoloured state of the thermochromic composition may be retained after removal of the source of heat or cold required for respectively discoloration or coloration. Depending on whether the composition approaches a particular temperature from a lower or higher temperature, the composition may be coloured or discoloured at that particular temperature.

Where the thermochromic composition is heated above a certain temperature, in the discoloured state, the coloured state may not reappear on cooling the composition until temperature $T_1$ is reached. This may be referred to as the "locking temperature" This provides a means of determining whether the composition has been subjected to the locking temperature which may be beneficial especially in medical applications or other applications where health or safety considerations are important. The hysteresis width, locking temperature and the minimum temperature at which colour reappears are dependent on the components of the composition.

BACKGROUND ART

Trisphenyl derivatives and bisphenyl derivatives are known from GB-A-2541910.

We have now found that novel colour change compositions containing compounds of a certain structure based on a polycyclic aromatic ring (PAH) provide an excellent combination of characteristics including good thermal and chemical stability and a large hysteresis width. The compounds are compatible with a wide range of electron accepting and electron donating components, enable control of the colour and discolour characteristics of the composition, stability and may be tailored to provide desired hysteresis characteristics and flexibility in formulating the colour change composition.

SUMMARY OF THE INVENTION

In a first aspect, the invention provides a colour change composition comprising: A) an electron donating organic colouring compound, B) an electron accepting compound and C) a compound of formula (I):

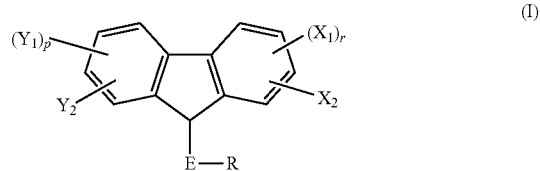

(I)

wherein:
E is an ester linked —O—CO or —CO2- and R is independently selected from an optionally substituted linear or branched alkyl group, alkenyl cycloalkyl group, alkenyl group, alkoxy group, aryl and alkylene aryl group; having from 4 to 22 carbon atoms, preferably $C_{4-22}$ alkyl, more preferably $C_{4-18}$ alkyl, especially $C_6$ to $C_{18}$ alkyl for example C alkyl, $C_7$ alkyl, $C_8$ alkyl, C₉ alkyl, C₁₀ alkyl, C₁₁ alkyl, C₁₂ alkyl, C₁₃ alkyl, C₁₄ alkyl, C₁₅ alkyl, C₁₆ alkyl, C₁₇ alkyl and C₁₈ alkyl or C₆₋₂₂ alkylene or cyclic, preferably aryl, optionally substituted with a $C_1$ to $_{22}$ alkyl group, for example phenyl;

$Y_1$ $Y_2$ $X_1$ and X2 are independently selected from hydrogen, R', —OR' and halogen wherein R' is independently selected from an optionally substituted linear or branched alkyl group, alkenyl group, alkoxy group, aryl group and an alkylene aryl group; preferably having from 1 to 22 carbon atoms, preferably $C_{1-22}$ alkyl, more preferably $C_{1-18}$ alkyl, especially $C_{1-6}$ alkyl or $C_{1-22}$ alkylene, preferably $C_{1-6}$ alkylene or cyclic, preferably aryl, optionally substituted with a $C_1$ to $_{22}$ alkyl group, for example phenyl;

r and p each represent and integer from 0 to 3.

The invention also provides for the use of a compound of formula (I) in a colour change composition especially for use as a solvent for a colour former and a colour developer in an a colour change composition, preferably in a thermochromic composition. Preferably, the solvent is encapsulated. Advantageously, the solvent is in the liquid state at a temperature below its melting point, that is supercooled, when encapsulated, enabling the thermochromic composition to be coloured or colourless.

The term "optionally substituted" as employed herein means that the group or moiety may be substituted with one or more substituents but preferably is unsubstituted. If a substituent is present, it may be selected a group containing a heteroatom but is preferably a hydrocarbyl group containing only hydrogen and carbon atoms. Examples of substituents include nitro, chloro, fluoro, bromo, nitrile, hydroxyl, thiol, a carboxylic acid group, a carboxylic ester group, $C_{1-22}$-alkoxy, $C_{1-22}$-alkyl, $C_{1-22}$-alkenyl, $C_{1-14}$ aryl or $C_{1-6}$ alkaryl, amino, amino $C_{1-22}$-alkyl and amino di ($C_{1-22}$-alkyl).

The term aryl refers to a five or six membered cyclic, 8-10 membered bicyclic or 10-14 membered tricyclic group with aromatic character and includes groups which contain only hydrogen and carbon atoms and also heteroaromatic groups which contain hydrogen, carbon and one or more heteroatoms, for example, N, O or S. Examples of suitable aryl groups include phenyl, pyridinyl and furanyl. Where the term "alkylaryl" is employed herein, the immediately preceding carbon atom range refers to the alkyl substituent only and does not include any aryl carbon atoms. Examples of alkaryl groups include benzyl, phenylethyl and pyridylmethyl. Advantageously the aryl group is a phenyl group.

In some embodiments, optional substituents are selected from halogen, for example chlorine, halo alkyl, for example $C_{1-6}$ halo alkyl and $C_{14}$ alkoxy, for example methoxy.

In one preferred embodiment, $Y_1$, $X_1$, $Y_2$ and $X_2$ are hydrogen, such that compound (I) has a formula (II):

Formula II

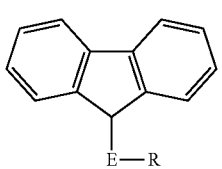

E is an ester linked —O—CO or —CO₂— and R is independently selected from an optionally substituted linear or branched alkyl group, alkenyl cycloalkyl group, alkenyl group, alkoxy group, aryl and alkylene aryl group; having from 4 to 22 carbon atoms, preferably $C_{4-22}$ alkyl, more preferably $C_{4-18}$ alkyl, especially C to $C_{18}$ alkyl for example C alkyl, $C_7$ alkyl, $C_8$ alkyl, $C_9$ alkyl, $C_{10}$ alkyl, $C_1$ alkyl, $C_{12}$ alkyl, $C_{13}$ alkyl, $C_{14}$ alkyl, $C_{15}$ alkyl, $C_{16}$ alkyl and $C_{17}$ alkyl or $C_{6-22}$ alkylene or cyclic, preferably aryl, optionally substituted with a $C_1$ to $_{22}$ alkyl group, for example phenyl.

The compound of formula II may be of Formula IIa or Formula IIb:

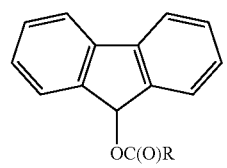

(IIa)

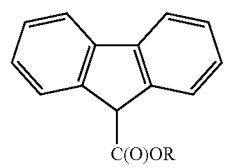

(IIb)

wherein R is independently selected from an optionally substituted linear or branched alkyl group, alkenyl cycloalkyl group, alkenyl group, alkoxy group, aryl and alkylene aryl group; having from 1 to 22, preferably 4 to 22 carbon atoms, preferably $C_{4-22}$ alkyl, more preferably $C_{4-18}$ alkyl, especially C to $C_{18}$ alkyl for example C alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl and $C_{18}$ alkyl or $C_{6-22}$ alkylene or cyclic, preferably aryl, optionally substituted with a $C_1$ to $_{22}$ alkyl group, for example phenyl.

Suitably, the group R comprises only hydrogen and carbon atoms. R is preferably saturated, that is an alkyl group. R is suitably a mid- to long-chain substituent having at least 6 carbon atoms. Where E is —O—CO, R preferably comprises an odd number of carbon atoms, namely, 5, 7, 9, 11, 13, 15 or 17 and where E is —CO₂—, R preferably comprises an even number of carbon atoms, namely 4, 6, 8, 10, 12, 14, 16 or 18.

In a preferred aspect R is of formula $C_nH_{2n+1}$ and n is from 4 to 18, preferably 9 to 18.

The preferred linkage E is O—CO. Preferably, where substituted, Compound (I) preferably has a substituent at the 2 and 7 position of the tricyclic ring.

In another aspect, the invention provides a compound of formula (III):

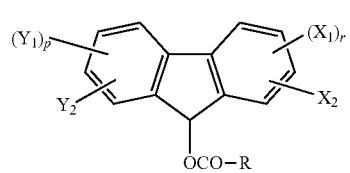

(III)

wherein:
R is independently selected from an optionally substituted linear or branched alkyl group; having from 4 to 22 carbon atoms, preferably $C_7$ to $C_{17}$ alkyl, especially $C_{11}$ to $C_{17}$ alkyl for example $C_{10}$ alkyl, $C_{11}$ alkyl, $C_{12}$ alkyl, $C_{13}$ alkyl, $C_{14}$ alkyl, $C_{15}$ alkyl $C_{16}$ and $C_{17}$ alkyl $Y_1$ $Y_2$ $X_1$ and X2 are independently selected from hydrogen, R', —OR' and halogen wherein R' is independently selected from an optionally substituted linear or branched alkyl group, alkenyl group, alkoxy group, aryl group and an alkylene aryl group; preferably having from 1 to 22 carbon atoms, preferably $C_{1-22}$ alkyl, more preferably $C_{1-6}$ alkyl or $C_{1-22}$ alkylene, preferably $C_{1-6}$ alkylene or cyclic, preferably aryl, optionally substituted with a $C_1$ to $_{22}$ alkyl group, for example phenylr and p each represent and integer from 0 to 3

Preferably compound (I) has the following formula compound (IV) or compound (V):

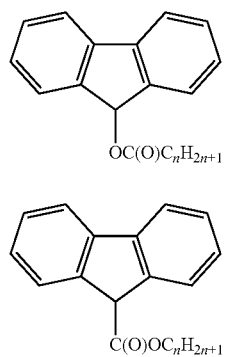

Compound (IV)

OC(O)$C_nH_{2n+1}$

Compound (V)

C(O)OC$_n$H$_{2n+1}$ in which $Y_1$, $Y_2$ $X_1$ and $X_2$ are all hydrogen.

Preferably the compounds of formula (IV) and (V) are selected from compounds of formulae (IVa), (IVb), (IVc) and (IVd) and (Va) and (Vb) as shown below:

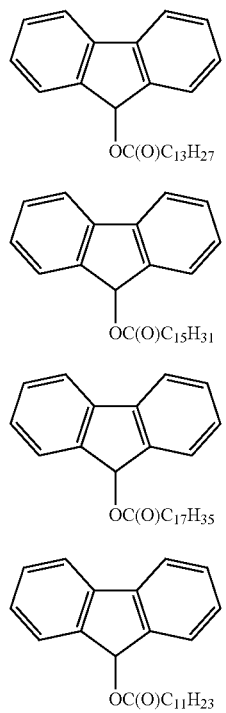

(IVa)

OC(O)$C_{13}H_{27}$ (IVb)

OC(O)$C_{15}H_{31}$ (IVc)

OC(O)$C_{17}H_{35}$ (IVd)

OC(O)$C_{11}H_{23}$

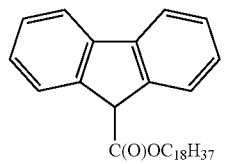

(Va)

C(O)OC$_{18}$H$_{37}$

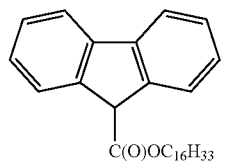

(Vb)

C(O)OC$_{16}$H$_{33}$

The compounds of formula (II), (IV) and (V) as defined above and in particular of formulae (IVa), (IVb), (IVc), (IVd), (Va) and (Vb) are particularly useful as components of a colour change composition.

The invention provides for use of a compound of any one of formulae (I) to (IV) as defined above and in particular of (IVa), (IVb), (IVc), (IVd), (Va) and (Vb), in a colour change-memory composition.

In preferred embodiments of the first aspect of the invention, the compound (I) is suitably a compound selected from a compound of formulae (II) to (VI) as defined above and in particular of (IVa), (IVb), (IVc), (IVd), (Va) and (Vb) defined above.

Compositions and pigments according to the invention provide a wide hysteresis and a tuneable hysteresis. By varying the colour change memory composition formulation the width of the hysteresis may be varied and the complete decolouring temperature T4 may be varied, allowing excellent flexibility in the design of the colour change memory microcapsule pigment.

Any suitable known or future electron donating colouring compounds, component A) of the composition and conventionally known as a colour former, may be employed. Examples of suitable classes of compounds include indolyles, phthalides, azaphthalides, fluorans, styrylquinoline and diazarhodamine lactones.

Particular examples of component A) include 3-(4-diethylamino-2-hexyloxyphenyl)-3-(1-ethyl-2-methylindol-3-yl)-4-azaphthalide, 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino)fluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1-2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1' (3'H)isobenzofuran]-3'-one, 2-(diethylamino)-8-

(diethylamino)-4-methyl-, spiro[5H-(1)benzopyrano(2,3-d) pyrimidine-5,1'(3'H)isobenzofuran]-3'-one, 2-(di-n-butylamino)-8-(di-n-butylamino)-4-methyl-, spiro[5H-(1)benzopyrano(2,3-d)pyrimidine-5,1'(3'H)isobenzofuran]-3'-one, 2-(di-n-butylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(N-ethyl-N-i-amylamino)-4-methyl-, spiro[5H-(1)benzopyrano(2,3-d)pyrimidine-5,1'(3'H)isobenzofuran]-3'-one, 2-(di-n-butylamino)-8-(din-butylamino)-4-phenyl, 3-(2-methoxy-4-dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

Advantageously, component A) is selected from the group consisting of 3-(4-diethylamino-2-hexyloxyphenyl)-3-(1-ethyl-2-methylindol-3-yl)-4-azaphthalide, 3,3-bis(1-n-butyl-2-methylindol-3-yl)phthalide and 2-(2-chloroanilino)-6-di-n-butylaminofluoran.

Any suitable known or future electron accepting group component B) of the composition may be employed. Examples of suitable classes of compounds include compounds having labile or active protons, pseudo-acidic compounds, or electron voids. Examples of classes of compounds having active protons include compounds having a phenolic group such as mono- and poly-phenols bearing substituents known in the art and their metal salts.

Examples of suitable component B) compounds include: phenol, o-cresol, tertiary butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2' dihydroxybiphenyl, 3-fluorosalicylic acid, 4-fluorosalicylic acid 5-fluorosalicylic acid, 3-chloro salicylic acid 4-chloro salicylic acid, 5-chloro salicylic acid, 3-bromo salicylic acid, 4-bromo salicylic acid, 5-bromo salicylic acid, 3,5 Di-tert-butylsalicylic acid, 3,5 Di-tert-isopropylsalicylic acid, 3,5 dibromo salicylic acid, 3,5-Dichloro salicylic acid, 3,5-DiFluoro salicylic acid, 3,5,6-trichloro salicylic acid, 3,5,6-tribromo salicylic acid, 3,5,6-trichfluoro salicylic acid, 3,4,5,6 tetrafluoro salicylic acid, 2-hydroxypyridine-3-carboxylic acid, 6-hydroxypyridine-3-carboxylic acid, 2-hydroxynicotinic acid, 2,6-dimethyl-nicotinic acid, 5-hydroxynicotinic acid, 6-hydroxynicotinic acid 6-methoxynicotinic acid 3-hydroxypyridine-2-carboxylic acid, 6-hydroxypyridine-3-carboxylic acid, 2-hydroxy-6-methypyridine-3-carboxylic acid, 2-hydroxy-6-methypyridine-4-carboxylic acid, 1,3.5-tris(4-carboxyphenyl)benzene, 2,2-bis (4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl) sulfide, 1-phenyl-1,1,-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane, 2,2-bis(4-hydroxyphenyl)-n-nonane, 4,4',4"-methylidenetrisphenol, 2,6-bis[(2-hydroxy-5-methylphenol)methyl]-4-methylphenol, 4,4'-[1-[4-[1-(4-hydroxyphenyl)-1-methylethyl]phenyl]ethylidene]bisphenol, 4,4',4"-methylidenetris[2-methylphenol], 4,4'-[(2-hydroxyphenyl)methylene]bis[2,3,6-triphenylphenol], 2,2-methylenebis[6-[(2-hydroxy-5-methylphenyl)methyl]-4-methylphenol], 2,4,6-tris(4-hydroxyphenylmethyl)1,3-benzenediol, 4,4',4"-ethylidenetrisphenol, 4,4'-[(4-hydroxyphenyl)methylene]bis[2-methylphenol], 4,4-[(4-hydroxyphenyl)methylene]bis[2,6-dimethylphenol], 4,4'-[(4-hydroxyphenyl)methylene]bis[2-methylphenol], 4,4'-[(4-hydroxyphenyl)methylene]bis [2,6-dimethylphenol], 4,4'-[(4-hydroxy-3-methoxyphenyl)methylene]bis[2,6-dimethylphenol], 2,4-bis[(5-methyl-2-hydroxyphenyl)methyl]-6-cyclohexylphenol, 4,4'-[1-[4-[1-(4-hydroxy-3-methylphenol)-1-methylethyl]phenyl]ethylidene]bis[2-methylphenol], 4,4'-[(4-hydroxyphenyl)methylene]bis[2-cyclohexyl-5-methylphenol], 4,6-bis[(4-hydroxyphenyl)methyl]1,3-benzenediol, 4,4'-[(3,4-dihydroxyphenyl)methylene]bis[2,6-dimethylphenol], 4,4'-(1-phenylethylidene)bisphenol, 5,5'-(1-methylethylidene)bis[1-phenyl-2-ol], 4,4',4"-methylidenetrisphenol, 4,4'-[1-[4-[1-(4-hydroxyphenyl)-1-methylethyl]phenyl]ethylidene]bisphenol, 4,4'-(phenylmethylene)bisphenol, 4,4'-[1,4-phenylenebis(1-methylethylidene)]bis[2-methylphenol], 5,5'-(1,1-cyclohexylidene)bis[1-biphenyl-2-ol], bis(3-methyl-4-hydroxyphenyl)sulfide, bis(3,5-dimethyl-4-hydroxyphenyl), bis(3-ethyl-4-hydroxyphenyl)sulfide, bis(3,5-diethyl-4-hydroxyphenyl)sulfide, bis(3-propyl-4-hydroxyphenyl)sulfide, bis(3,5-dipropyl-4-hydroxyphenyl)sulfide, bis(3-t-butyl-4-hydroxyphenyl)sulfide, bis(3,5-t-butyl-4-hydroxyphenyl)sulfide, bis(3-pentyl-4-hydroxyphenyl)sulfide, bis(3-hexyl-4-hydroxyphenyl)sulfide, bis(3-heptyl-4-hydroxyphenyl)sulfide and bis(5-octyl-2-hydroxyphenyl)sulphide, Advantageously component B) can be a mixture of at least two of the above-mentioned component. Advantageously component B) is selected from the group consisting of 1,1'-bis(4-hydroxyphenyl)cyclohexane, 4,4'-(1-phenylethyllidene)bisphenol, and 2,2-bis(4-hydroxy-3-methylphenyl)propane and mixture thereof.

Suitably, the ratio of components B) to C) In parts by weights is in the range 0.5 to 40 and preferably within 1 to 20. The ratio of components A) to C) In parts by weights is suitably in the range 0.5 to 30 and preferably within 1 to 20.

Any one or more of components A), B) and C) may comprise 2 or more compounds. Conventional additives for example emulsifiers, antioxidants, UV absorbers, metal chelates may also be included in the composition.

The composition of the invention suitably comprises a homogeneous solubilised mixture of the components A), B) and C) of the composition. Preferably, components A) and B) are dissolved in component C) to produce the composition.

In a further aspect, the invention provides a colour change composition comprising: A) an electron donating organic colouring compound, B) an electron accepting compound and C1) a first compound of formula (I) to (III) and C2) a second compound of formula (I) to (V) wherein C1) and C2) are different.

As desired, the composition may additionally comprise third or further compounds of formula (I) to (V).

Preferably, C1) and C2) are independently selected from compounds of formula (IVa), (IVb), (IVc), (IVd), (Va) and (Vb). In a preferred embodiment component (C) comprises a mixture of a compound of formula Va and IVb.

Where E comprises —O—CO—, component C) is suitably synthesised by stirring a mixture of 1 mole of fluorenol and 1.5 moles of triethyl amine in acetone and cooling to 5° C. 1 mole of acid chloride having the desired group R is added gradually so that temperature does not rise above 35° C. during the addition. After the addition is complete the reaction is brought to room temperature and stirred for 40 hours. The resulting reaction medium is then poured into 10% aqueous ice cold HCl. The precipitate is filtered off and washed with water. The solid precipitate is crystallised from isopropanol. Suitably, the relative quantities of Fluorenol/triethylamine/acid chloride are 1/1.5/1 mole. Fluorenol is available from Sigma aldrich and substituted fluorenols are available from Nanjing King Pharma Co.

Where E comprises —$CO_2$—, component C) is suitably synthesised by dissolving the alcohol R—OH in toluene at room temperature, for example 0.22 moles of alcohol may be dissolved in 300 mL of toluene. An equimolar amount of 9-fluorenecarboxylic acid, available from Alfa Aesar, is suitably added followed by p-toluene sulphonic acid·$H_2O$ at about 0.1 of the molar quantity of acid. The mixture is suitably refluxed with azeotropic removal of water for 3 hours (or until no more water is collected). Toluene is then removed from the reaction mixture under reduced pressure. The residue is washed with an alkali, for example bicarbonate solution, to remove excess 9-fluorenecarboxylic acid. The resulting solid is filtered and washed with water to neutral and then dried. The crude ester may be recrystallized for example from isopropyl alcohol.

In a further aspect, the composition of the invention may comprise a modifier D) to modify the properties of the composition as compared to the same composition without component D), for example by modifying the melting point characteristics of the composition. The modifier D) is preferably selected from a fatty ester, a fatty alcohol and a wax. Suitable examples of fatty esters include, for example adipate, suberate, sebacate, dodecanoate, caprylate, caprate, laurate, palmitate, myristate, stearate, arachidate, behenate. Examples of suitable fatty alcohols include capryl alcohol, capric alcohol, lauryl alcohol, myristyl alcohol, cetyl alcohol, stearyl alcohol, arachydil alcohol and behenyl alcohol. Examples of suitable waxes include paraffin waxes, montan wax, microcrystalline wax, carnauba wax, beeswax, polyethylene wax, lanolin, shellac, castor wax, Japan wax. Soy wax, tallow wax and Ceresin wax.

Suitably, the colour change composition provides excellent stability and resistance to colour-change when subjected to pressure or physical impact. We have found that including a non-ionic surfactant in the composition may enhance these properties.

The invention provides in a further aspect for the use of a non-ionic surfactant in a colour change composition to provide increased stability or resistance to colour-change when subjected to pressure, scratching or marking, particularly when the composition is in a clear or colourless state as a printed item.

The term "surfactant" refers to a compound which has a hydrophilic group or region and a hydrophobic group or region. The non-ionic surfactant is preferably an alkoxylate which has a hydrophobic terminal group.

The hydrophobic terminal group is suitably a hydrocarbyl and preferably an alkyl, group. The alkyl group is preferably a $C_1$ to $C_{22}$ group, more preferably $C_7$ to $C_{22}$ especially a $C_9$ to $C_{15}$ group for example a mixed $C_9/C_{11}$ group and a mixed $C_{13}/C_{15}$ group. The alkyl group is suitably derived from an alcohol or an amine, preferably a primary amine. The alkoxylate is suitably based on multiple units of alkylene oxide and is preferably an ethoxylate, a propoxylate, a butoxylate or a mixture of two or more alkoxylates. Preferably the alkoxylate is an ethoxylate. The mixture may be a random or block arrangement of the different alkoxylates. The alkoxylate preferably comprises from 2 to 30, more preferably 2 to 15 and desirably 3 to 12 alkylene oxide units.

Suitably the non-ionic surfactant has a formula Q:

R'[Het][($CH_2$)qO]rR"         (Q)

wherein R' is a hydrocarbyl, for example an alkyl group, alkenyl group, aryl group and alkylaryl group having from 1 to 22 carbon atoms, more preferably a $C_1$ to $C_{22}$ group, more preferably a $C_7$ to $C_{22}$ and especially a $C_9$ to $C_{15}$ alkyl, alkenyl or alkylaryl group; Het is O, S or NH or NR'; g is 2 to 4, preferably 2; r is 2 to 30, preferably 3 to 12; and R" is selected independently from R' and H.

The non-ionic surfactant may be "end-capped" which refers to the case where R" is selected from the substituents defining R'. The terminal groups R' and R" may be the same or different.

Suitably, the non-ionic surfactant has a molecular weight from 300 to 1500, preferably 500 to 1000. Preferably the non-ionic surfactant comprises an alcohol alkoxylate or an amine alkoxylate.

Examples of suitable non-ionic surfactants include those available under the BIOSOFT trade name from Stepan, the LUTENSOL and TETRONIC trade names from BASF, the EMULSOGEN and GENAPOL trade names from Clariant and products available under the EMPILAN, HYDRAPOL, SURFONIC, BIONIC and TERIC trade names from Huntsman, TERGITOL and TRITON trade names from DOW Chemicals, Advantageously, the colour change composition may contain also a carrier, such as a solvent for example an aqueous or organic solvent, advantageously an aqueous solvent. The colour change composition may also contain other additives known to one skilled in the art to be useful for preparing a colour change composition for example a dispersing agent, an emulsifying agent, a surface-tension modifier, a surfactant, an humectant, a resin, a biocide and the like.

FIG. 1 of the accompanying drawings shows a typical hysteresis profile for a reversible thermochromic colour memory composition. Colour density is plotted against temperature. The colour density advancement due to temperature change on heating and cooling cycles is illustrated and progresses in the direction of the arrow. Point A at T4 is the fully decolourised state (herein will be called fully decoloured temperature); point B at T3 is the point at which the composition is in a fully coloured state during heating. Point C shows the last point at which the composition is fully discoloured during cooling at T2; Point D is the point at which the composition is in a fully coloured state during cooling at T1 ((herein will be called fully coloured temperature). It will be apparent that the thermochromic composition may be in fully coloured state or a fully discoloured state at a said temperature between T2 and T3 depending on whether the composition is being heated from a lower temperature or cooled form a higher temperature. The difference between temperatures T3 and T2 ($\Delta H_{T3-T2}$) is the practical value for hysteresis (herein will be called practical hysteresis).

The difference between T1 and T2 ($\Delta H_{T2-T1}$) is related to the sensitivity of the colour change mechanism. The lower the value of $\Delta H_{T2-T1}$, the sharper the transition between the last point of the fully coloured state and the fully discoloured state and also the sharper the transition between last point of the fully discoloured state and the fully coloured state. Colour density difference or colour contrast is measured by the difference of colour between E and F as shown in FIG. 1.

The components A), B) and C) of the composition may be selected and the relative amounts employed to tailor properties of the composition to the desired use. The component is suitably selected to provide the desired practical hysteresis and the sensitivity of the colour change, as well as the desired colour-change temperatures T1 and T4.

Suitably, the practical hysteresis range may be from 10 to 80° C. and preferably is at least 50° C. The fully de-coloured temperature T4 is suitably higher than ambient temperature, preferably higher than 45° C., more preferably higher than 50° C. and especially higher than 65° C. The fully coloured temperature T1 is suitably lower than 20° C., for example 0° C. preferably lower than 0° C. The composition is suitable for use as a "freeze indicator" where temperature T1 is 0° C. and is suitable for use in pen applications where the temperature T1 is lower than 0° C.

Suitably, the colour change composition or a compound according to the invention is microencapsulated to provide a colour change memory microcapsule colouring, for example a pigment by a known method.

The invention further provides a colour change composition in the form of a microencapsulated pigment comprising a microencapsulated composition according to the invention. Suitably, the composition is homogeneous.

The microcapsules suitably have a particle size from 0.5 to 50 microns, preferably 1 to 20 microns so as to provide suitable dispersion stability and processing characteristics whilst providing high density colour.

Unless otherwise stated, all particle sizes referred to herein are measured by volume using a Coulter particle size analyser by laser diffraction, All figures given for particle size represents the 90% fraction of particles showing diameter no larger than the specified size.

The composition may be microencapsulated by any known method, for example by using isocyanate interfacial polymerisation, melamine or urea formaldehyde interfacial polymerisation, free radical interfacial polymerisation, polycondensation of epoxy or complex coacervation.

Microencapsulation allows the colour change memory composition to retain its composition when in contact with chemicals or heat. Chemicals are blocked by the microcapsule walls and the formulation of the composition is retained. The microencapsulation may also have a practical benefit on the way the colour change memory composition performs.

The microencapsulated pigment enables the colour change memory composition to be used in paint, coating and plastic vehicle either as water based pigment dispersion or a pigment powder.

Compositions and compounds of the invention may be employed in any applications in which temperature dependent colour-change is required or desirable. for example in providing an indication of low or high temperature, tamper-evident indicators and the like.

Examples of such applications include toys, printed materials, decoration, writing instruments, temperature indicators in packaging of medical products such as vaccines and in a wide range of industrial applications such as in curing or bonding processes, pipes, measurement of surface temperature, indication of overheating for example of machinery, plant or the like.

A need to improve the security of sealed packages or articles in a cost effective and reliable manner remains. For certain products it is essential to know whether the product has been subjected to a temperature below a certain level for reasons of health and safety and for quality assurance and the like. For example certain medical products such as vaccines must not be subjected to temperatures below around 2° C. or the efficacy of the vaccine may be compromised with adverse and potentially dangerous consequences for individual or public health.

Adhesives find wide-spread use in many fields in the manufacture of goods for example motor vehicles and in aerospace in which ensuring effective bonding between parts is essential for quality control and also for product safety. It is important to be aware of whether an adhesive has been subjected to temperature cycling or heated or cooled above or below a threshold temperature at which its function may be impaired.

Certain visual indicators are used to indicate exposure to low temperatures of freezing temperatures. "Freeze indicators" are known and comprise electronic means or chemical means of indicating a given temperature, typically a visual indication for example a permanent colour change, upon exposure to a certain temperature. Known freeze indicator products are relatively bulky items and are used for indicating the temperature of bulk-packaged goods, for example on pallets and in goods containers. The size or bulk of known temperature-indicators renders them unsuitable for use as indicators for smaller or individually packaged products. Furthermore, known products typically contain a liquid or a mixture of liquids embedded in a pouch and their costs of manufacture are relatively high due to low speeds of processing.

Accordingly, there remains a need for tamper-evident security product and a temperature-indicator product which provides a visual indication to indicate tampering or the product having been subjected to a low or high temperature. A further need exists to provide a product which may exist in two different coloured states at a given temperature and which are economic to produce, suitable for labelling of individual products and are not bulky.

A colour change composition according to the invention may be used to provide a novel indicator product to provide an indication of a change of temperature.

The invention provides in a further aspect an indicator comprising a first colour change memory composition or compound according to the invention. The indicator suitably provides a visual indication of whether the composition or compound has been subjected to a pre-determined temperature which may be elevated or lower relative to ambient.

In a preferred embodiment, the indicator comprises:
A) a first colour change memory composition or compound according to the invention; and
B) a second composition selected from:
  i) an irreversible colour change ink capable of irreversibly changing colour at a specified temperature ($T_{irrev}$);
  ii) a second colour-change memory composition in its lower temperature state and wherein the first colour-change composition is in its higher temperature state; and
  iii) a mixture of i) and ii).

Reference herein to "lower temperature state" means the coloured or decoloured state of the composition or compound in which it exists at or below its T1 temperature, irrespective of whether the composition or compound is in fact at a temperature below T1. Thus a composition may be in its lower temperature state whilst in fact at a temperature between its T2 and T3 temperatures if it was previously below its T1 temperature. In a similar manner, reference to "higher temperature state" means the coloured or decoloured state of the composition or compound in which it exists at or above its T4 temperature, irrespective of whether the composition or compound is in fact at a temperature above T4.

Preferably the second composition comprises an irreversible colour change ink. Where the $T_{irrev}$ temperature of the irreversible colour change ink is greater than ambient, preferably 30° C. or greater or 50° C. or greater, the first colour change memory composition or compound is in its higher temperature state. One of the irreversible colour change ink and the first colour change composition will change colour depending on whether temperature falls or rises such that it is not then possible to revert to the initial state in which the two compositions are in. This provides a visual indication of the composition or compound being subjected to a lower or higher temperature at which colour change occurs.

Suitably, the first colour change composition and the second colour change composition are disposed on a surface in the same are providing a single indicator or may be disposed on a surface in separate areas providing two separate indicators.

Preferably, the first thermochromic composition and second composition are, respectively, in a state such that an increase in the temperature of the indicator to the T3 temperature of the first composition will change the state of one of the first and the second composition and a decrease in the temperature of the indicator to the T2 temperature of the first composition will change the state of the other said composition.

The invention also provides a process for producing an temperature indicator product comprising:
  i) a first thermochromic colour-memory composition which comprises an electron-donating colouring organic compound (A), an electron-accepting colouring organic compound (B) and reaction medium compound (C) and
  ii) a second composition selected from:
    a. an irreversible colour change ink;
    b. a second thermochromic colour-change composition in its higher temperature state and wherein the first thermochromic colour-change composition is in its lower temperature state; and
    c. a mixture of i) and ii).
the process comprising providing a support with the first colour-change composition, having colour change temperatures T1, T2, T3 and T4, heating the first composition to a temperature exceeding T4, cooling the second composition, to a temperature below T1, applying the said first composition and second composition to the support and drying the first and second compositions at temperature not exceeding temperature T3 and not below temperature T2.

Suitably, the first composition is thermochromic and will typically exhibit hysteresis characteristics as shown in FIG. 1 as it is cooled or heated to or beyond the colour-change temperatures T2 and T3. If the second composition is an irreversible colour change ink the ink will change colour when subjected to a particular temperature and stay in that colour. The first and second composition may be intimately mixed as shown in FIGS. 4*a* and 4*b* and provide a single area on the indicator comprising both compositions or as separate areas, for example as illustrated in FIGS. 2 and 3 in the specification.

Where the product comprises a first and a second thermochromic composition, one will suitably be in its higher temperature state and the other in its lower temperature state. Taking the case where the first composition is in its low temperature colour state and the second composition is a thermochromic composition in its high temperature decoloured state, where the indicator is subject to a higher temperature (above T3 of the first composition) or a lower temperature (below T2 of the second composition) If subjected to a temperature above the T3 of the first composition, the first composition will transition into its high colour state. Upon cooling, the first composition will remain in its high colour state until the temperature reaches T2 and then transition to its lower temperature state. The second composition will remain in its high colour state and transition to its low colour state at its T2 temperature (if reversible). Having reached T3, the indicator will change to a different colour (when the first and second composition are intimately mixed or if separate, the change in colour of the first composition will be self-evident) due to the change in colour or decolouration of the first composition and, on cooling below T2 of either composition, will change colour again.

If the indicator is cooled to a temperature below T2, the second composition will transition to its low colour temperature (the first composition, already being in its lower colour state) and form a certain colour (both compositions low temperature colour) and upon heating to beyond T3 will change colour (both compositions in high temperature colour or decoloured). Whether the indicator is heated above T3 or cooled below T2, the initial state of having one composition in its higher colour state and the other in its lower colour state (and providing a particular colour when mixed or separately observable colours when disposed as separate areas) can never be achieved again. The indicator provides a record that it has been subjected to a temperature below T2 or above T3. By setting the compositions to have a T2 and T3 temperature at a desired level, for example 40° C. and 0° C., a visual indication of exposure to such temperatures is provided.

The colour change composition may be located in a first portion and the second composition in a second portion. The first colour change composition and the second colour change composition may be the same or different. Suitably, the composition in the first area will be in its lower temperature state, typically coloured, and the composition in the second area will be in its higher temperature state, typically discoloured.

In one embodiment, the first portion and second portion may comprise the same or different colour change compositions. Where different colour compositions are employed, they may have the same or different colour change profiles. In one embodiment, a preferred embodiment, the same colour change composition is employed in the first portion and the second portion. If the indicator is subjected to a raised temperature above the colour change temperature of the first portion, both compositions will then exit in their higher temperature state. If the indicator is subjected to a lowered temperature below the colour change temperature of the second portion, both portions will then be in their lower temperature state. It will not be possible for the indicator to be placed in a state where the two portions are in respectively a lower and a higher temperature state and thereby provides evidence of exposure to temperature. Where an attempt is made to open a sealed package by freezing or heating the sealing adhesive to which the indicator is applied, the typical process of gaining unauthorised access will cause the indicator to change state irreversibly.

The temperature indicator is preferably a label and suitably which provides an effective and reliable indication of unauthorised tampering or of being exposed to a pre-determined low temperature and which may be tailored to provide desired hysteresis characteristics and flexibility in formulating the colour-change composition.

In a preferred embodiment the product accordingly comprises a colour change composition which is able to exist in both a coloured state and in a discoloured state at a predetermined temperature or two or more colour change compositions where one of the compositions provides a colour change below a pre-determined lower temperature and the other composition provides a colour change above a pre-determined higher temperature thereby to inform the observer that the compositions have been previously subjected to such a lower or higher temperature.

The invention further provides for a single use temperature-indicator product comprising a first portion comprising a colour-change composition in its coloured state and a second portion comprising the same or a different colour-change composition in its discoloured state wherein the composition comprises a reaction medium C) as described herein, preferably a compound of formula (I) to (V) as described herein.

Suitably, the indicator has a colour change composition or pigment suitably in the form of a printable ink applied to it and heated to a temperature exceeding T4 prior to application to the indicator, for example in a printing process. An ink showing permanent colour change at a desired temperature, for example 50° C. is applied to the indicator, for example printed next to the memory composition pigment converted into printed ink. The composition is suitably selected such that T3 and T4 are higher than the transition temperature of the permanent colour change ink, for example 50° C.

Any known permanent or irreversible colour change ink may be employed and a preferred example is available from TMC Hallcrest, under the brand name Kromagen, for example Kromagen Concentrate K60-NH Magenta.

The printed label is allowed to dry at temperature not exceeding T3 or 50° C. and preferably not below $T_2$. This combination of inks may suitably provide an indication of temperature below T2, for example 2° C. or 0° C. if the composition is selected such that T2 is 2° C. or 0° C. respectively, and act as a "freeze indicator". The indicator is suitably used a single time and thereby provides an indication of the indicator having been subjected to a temperature below T2.

In another preferred embodiment, the colour change composition is printable and provides a memory function in that it provides an indication of a previous temperature to which the composition has been subjected.

Advantageously, temperature indicator products according to the invention for example labels, may be produced using medium to high speed printing process for example screen printing, flexographic printing and gravure printing which facilitates production of labels for use with individual packages as well as for larger packs, pallets or containers. The colour change compositions described herein for use in the temperature-indicator product of the present invention may be employed in inks for multiple printing mode offset, flexo, gravure, screen, 3D printing, pad printing, spray coating and other coating modes and ink jet. The present memory colour-change composition or pigment can give memory colour change property to a variety of different substrates and materials suitable for use as temperature indicator products: gel, inks, paper, synthetic paper, coated paper, fiber, plastics, glass metal ceramic, wood, stone, plastics, concrete, synthetic glass.

The composition of the invention is especially suitable for use as an ink, preferably an aqueous gel ink, suitable for writing. The present invention also provides an aqueous gel ink composition for a writing instrument, comprising (1) a composition or compound according to the invention, (2) a viscosity control agent (3) a water soluble organic solvent and preferably (4) a preservative (5) a pH modifier and (6) water.

The viscosity control agent is suitably selected to avoid a material change of viscosity over time. Examples of suitable viscosity control agents include natural polymers such as Xantham gum, succinoglycan, starch and polysaccharides, synthetic polymers styrene acrylic polymers.

Suitable water soluble organic solvents include glycols such as polyethylene glycols, propylene glycols and glycerin and derivatives. Advantageously, the water soluble organic solvent reduces the risk of the pen tip of a ballpoint pen drying and prevents or reduces the risk of the ink freezing at very low temperature. A preservative may be added to the ink composition to preserve the quality and viscosity of the ink over time. A pH modifier may be added to control and adjust pH to about 7. Other optional components may be included including one or more of defoaming agents, fungicides, rust preventives and sequestering agents and the like.

In a preferred embodiment, the aqueous ink composition comprises
(1) A colour composition according to the invention, suitably as a water based dispersion at a level of 30 to 60%, preferably 40 to 50% for example 45% by weight;
(2) a viscosity control agent, for example a 2.0% solution of Rheozan (Solvay SA) at a level of 20 to 40%, for example 30% by weight;
(3) a water soluble organic solvent, preferably selected from a glycol, more preferably propylene glycol and glycerine. The solvent is preferably present at a level of 10 to 25%, for example 15% by weight of glycol and 5% by weight of glycerin;
(4) a preservative for example Proxel® XL2 by Lonza, an aqueous propylene glycol solution of 1,2-benzisothiazolin-3-one at a level of 0.1 to 0.5%, for example 0.2% by weight
(5) a pH modifier, for example aminomethylpropanol at a level of 0.1 to 0.5, for example 0.3% by weight;
(6) demineralized water to 100% by weight The colour change composition or irreversible colour change composition may also comprise a binder to act as an extender to enable the compositions to be employed as a flexographic printing ink. Preferably, the binder comprises an acrylic water based binder for example Kromagen W/B Flexo Binder available from TMC Hallcrest.

Suitably, the ink composition is prepared by mixing the components together.

Colour-change compositions as described herein are suitably useful in the production of printing inks for preparation of labels to provide a temperature indicator.

Where a single colour-change composition is employed, the composition suitably provides an indication of when temperature T4 is exceeded by remaining colourless, until the composition is subjected to temperature T1 and regaining colour at this point.

In a preferred embodiment, the colour-change composition or pigment where component C) is such that the composition or pigment temperature has a T2 temperature at a first temperature, for example 0° C. and a T3 temperature above a second temperature, for example 50° C.

A composition with these characteristics allows the design of an indicator which provides an indication of whether the indicator has been subjected to a particular temperature.

Suitably, the indicator is printed with a memory composition pigment, preferably converted into printed ink, heated to temperature exceeding temperature T4 prior to the printing process. A second sample of the composition is then suitably cooled to below temperature T1 and printed on the indicator, suitably next to the first print of the colour change composition. The printed label is allowed to dry at temperature not exceeding temperature T3 and not below temperature T2.

The invention is especially suitable for use in a temperature indicator including as a resettable temperature recording device and as a permanent temperature recording device.

The invention further allows the temperature indicator to provide a record of temperature change where temperatures are ascending and/or descending.

As further examples, the colour change composition of the invention may be employed in inks for example in multiple printing mode offset, flexo, gravure, screen, 3D printing, pad printing, spray coating and other coating modes and ink jet. The compositions may be provided as an ink composition for use in writing implements such as ball point pen, marking pen, fountain pen, gel pen, roller ball pen and other inks vehicles.

In a further aspect of the invention, there is provided an ink composition for a writing implement which comprises a colour change microencapsulated composition or compound according to the invention.

The invention further provides a writing implement comprising a writing implement containing, charged with or in combination with an ink composition or compound according to the invention. In particular the writing implement may be a ball point pen, a marking pen, a fountain pen, a gel pen or a roller ball pen. Advantageously the writing implement contains a means for erasing the ink composition.

The invention is especially suitable for use in labels, labelling and packaging, particularly for temperature sensitive products such as foods, medical products including vaccines. The compositions of the invention may also be employed in circumstances where use of heating or cooling to tamper with or gain unauthorised and/or undetected access is problematic. Use of the composition or compound of the invention in labels, packaging or as a component in a material, for example a colour-change plastic deters such unauthorised tampering or provides an indication and evidence of prior tampering.

The colour change composition may be used in vehicles such as wax, polymer resins, thermosetting resins where the melt blending of the colour change memory pigment allows manufacturing of pellet, powder of moulded or injected articles such as toys.

The colour change composition may also be employed to impart a memory colour change property to a variety of different substrates and materials including: gel, inks, paper, synthetic paper, coated paper, fiber, plastics, glass metal ceramic, wood, stone, plastics, concrete, synthetic glass.

Figure 1:
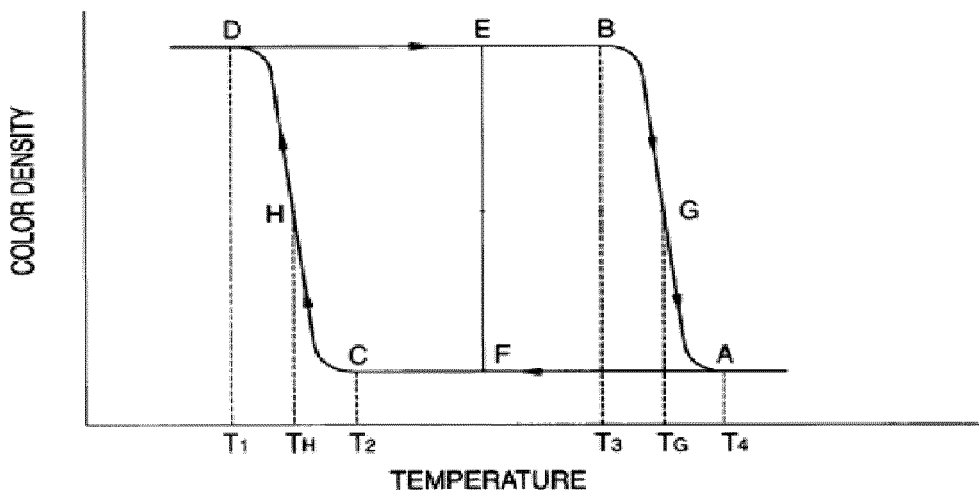
FIG. 1 shows a typical plot of changes in colour density against temperature for thermochromic compositions.

FIG. 1 of the accompanying drawings shows a typical hysteresis profile for a reversible colour-change composition. Colour density is plotted against temperature. The colour density advancement due to temperature change on heating and cooling cycles is illustrated and progresses in the direction of the arrow. Point A at T4 is the fully decolourised state (herein will be called fully decolorized temperature); point B at T3 is the point at which the composition is in a fully coloured state during heating. Point C shows the last point at which the composition is fully discoloured during cooling at T2; Point D is the point at which the composition is in a fully coloured state during cooling at T1 ((herein will be called fully coloured temperature). It will be apparent that the thermochromic composition may be in fully coloured state or a fully discoloured state at a said temperature between T2 and T3 depending on whether the composition is being heated from a lower temperature or cooled form a higher temperature. The difference between temperatures T3 and T2 ($\Delta H_{T3-T2}$) is the practical value for hysteresis (herein will be called practical hysteresis).

The difference between T1 and T2 ($\Delta H_{T2-T1}$) is related to the sensitivity of the colour change mechanism. The lower the value of $\Delta H_{T2-T1}$, the sharper the transition between the last point of the fully coloured state and the fully discoloured state and also the sharper the transition between last point of the fully discoloured state and the fully coloured state. Colour density difference or colour contrast is measured by the difference of colour between E and F as shown in FIG. 1.

Figure 2A:
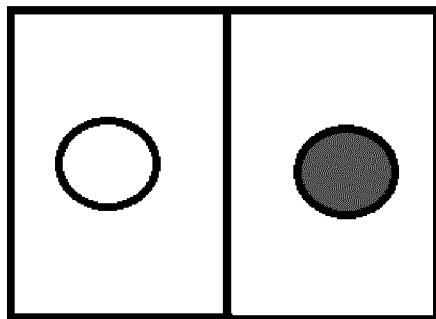
FIGS. 2a to 2c show a temperature freezing indicator label according to the invention based on a memory composition according to the invention.
Figure 2B:
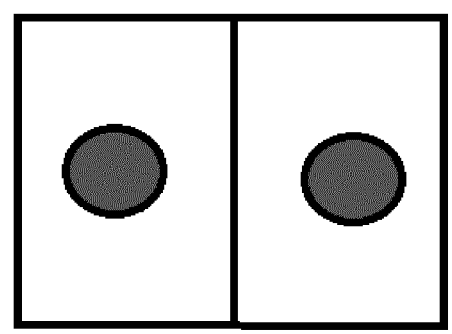
Figure 2C:
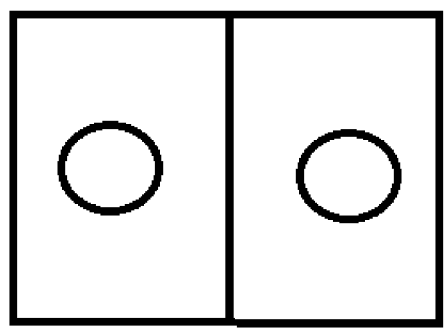

By way of illustration, in the initial state at ambient temperature above T2 and below T3 is represented in FIG. 2a. As the temperature drops below the temperature T2, and is kept below T3 at all times, the state of the indicator changes to that shown in FIG. 2b. By raising the temperature to greater than T4 the indicator provides two colourless compositions as shown in FIG. 2c).

Figure 3A:
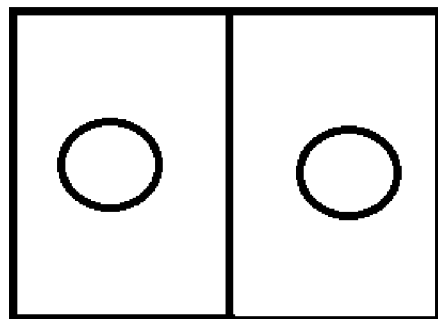
FIGS. 3a to 3c show examples of an indicator label according to the invention based on a memory composition containing Kromagen ink according to the invention.
Figure 3B:
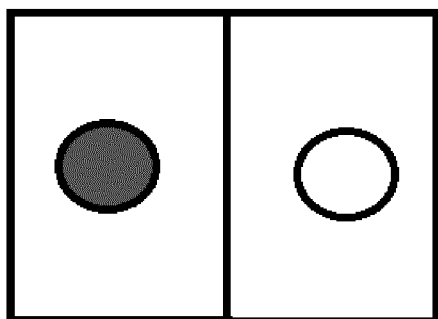
Figure 3C:
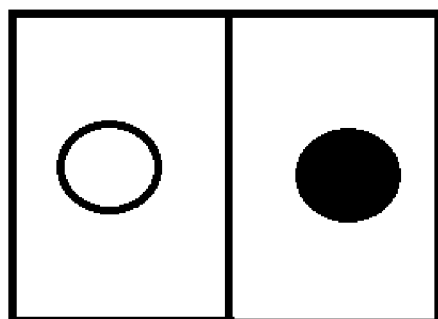

By way of illustration, FIGS. 3a, 3b and 3c illustrate the various forms of the temperature indicator product where the indicator comprises a thermochromic composition as described herein and further comprises Kromagen ink. FIG. 3a shows the initial state at ambient temperature above T2 and below the temperature of colour transition of Kromagen. FIG. 3b shows the indicator as the temperature drops below T2 and below the temperature at which Kromagen changes colour and FIG. 3c shows the indicator as it appears after heating above T4.

Figure 4A:
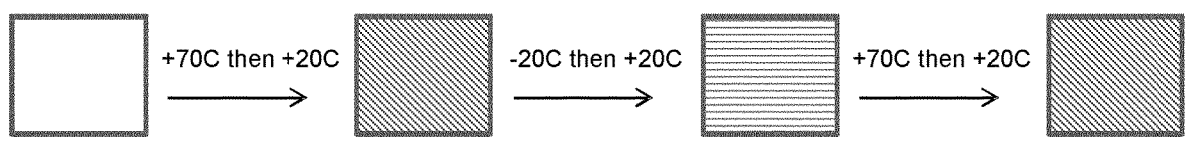
FIGS. 4a and 4b show examples of an indicator according to the invention containing a reversible colour change composition and an irreversible colour change composition.
Figure 4B:
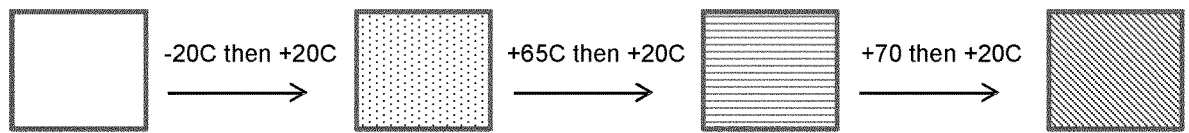

FIGS. 4a and 4b show a progressive change of colour on paper, Piece #1 in Example 17, Piece #2 in Example 18 when subjected to a progression of temperatures. The composition set out in Example 17 below was applied to Piece #1 with the colour change composition in its higher temperature, decoloured state and the irreversible second colour-change composition in its lower temperature state, showing as a colourless composition with the white paper showing through. On cooling to below T1 of the first composition, this changed to blue and remained blue on being heated to 20° C. On heating further to 65° C., the irreversible ink change colour such that the colours of the two compositions gave a purple colouration overall. On further heating to a temperature above T4 of the first composition, the blue colour of that composition cleared to colourless, leaving the magenta of the irreversible ink.

Piece #2 was subjected to heating to above 70° C. followed by cooling to −20° C. and returning to 70° C. and returning to ambient. The progression of colours was white to magenta, to purple (below T1 of the first composition) and then to magenta at 70° C.

The invention is now illustrated by the following non-limiting examples in which parts are by weight unless otherwise stated.

Example 1

A colour change memory composition was obtained by homogeneously compatibilizing:

26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorenol ester (Component C, specifically component IVa) as shown below):

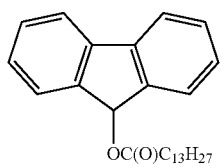

(IVa)

Component IVa is suitably synthesised by stirring a mixture of 1 mole of 9-fluorenol, commercially available from sigma aldrich, and 1.5 moles of triethyl amine in acetone and cooling to 5° C. 1 mole of tetradecanoyl chloride is added gradually so that temperature does not rise above 35° C. during the addition. After the addition is complete the reaction is brought to room temperature and stirred for 24-48 hours. The resulting reaction medium is then poured into 10% aqueous ice cold HCl. The precipitate is filtered off and washed with water. The solid precipitate is crystallised from isopropanol. The relative quantities of bisphenol/acid chloride/triethylamine are 1/1/1.5 moles.

The resulting memory composition changed colour from Magenta to colourless.

The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

Some of the resulting dispersion was then drum dried and the pigment in encapsulated form was isolated, the colour change memory pigment having a particle size of 2 microns changed colour from magenta to colourless.

Example 2

A colour change memory composition was obtained by homogeneously compatibilizing:

41 parts of 3,3-bis(2-ethoxy-4-N,N-diethylaminophenyl)-7(4)-azaphthalide (component A) available from Yamamoto Chemicals and 65 parts 4,4'-(1-phenylethyllidene)bisphenol, 20 parts of bis(4-hydroxyphenyl) sulfide and 30 parts of 1,1'-bis(4-hydroxyphenyl)cyclohexane (all components B)) available from Sigma Aldrich and 844 parts of 9-fluorenol ester (Component C, specifically component IVa).

The resulting memory composition changed colour from turquoise to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 2.5 microns changed colour from turquoise to colourless.

Example 3

A colour change memory composition was obtained by homogeneously compatibilizing:

41.5 parts of 3-(4-diethylamino-2-hexyloxyphenyl)-3-(1-ethyl-2-methylindol-3-yl)-4-azaphthalide (component A)) available from Yamamoto Chemicals, 48.5 parts of 2,2-bis (4'-hydroxyphenyl)hexafluoropropane, 48.5 parts of 4,4'-(1-phenylethyllidene)bisphenol (all components B)) available from Sigma Aldrich and 861.5 parts of 9-fluorenol ester (Component C, specifically component IVa).

The resulting memory composition changed colour from blue to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 3.0 microns changed colour from blue to colourless.

Example 4

A colour change memory composition was obtained by homogeneously compatibilizing:

26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorenol ester (Component C, specifically component IVb) as shown below):

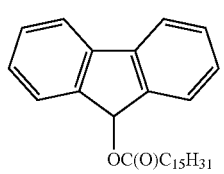

(IVb)

The resulting memory composition changed colour from magenta to colourless.

Component IVb was prepared using the same procedure as described in Example 1 for Component IVa save that hexadecanoyl chloride was employed rather than tetradecanoyl chloride.

The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then air dried and the pigment was isolated in encapsulated form, the colour change memory pigment having a particle size of 4 microns changed colour from magenta to colourless.

Example 5

A colour change memory composition was obtained by homogeneously compatibilizing:

41 parts of 3,3-bis(2-ethoxy-4-N,N-diethylaminophenyl)-7(4)-azaphthalide (component A)) available from Yamamoto Chemicals and 65 parts 4,4'-(1-phenylethyllidene) bisphenol, 20 parts of bis(4-hydroxyphenyl) sulfide and 30 parts of 1,1'-bis(4-hydroxyphenyl)cyclohexane (all components B)) available from Sigma Aldrich and 844 parts of 9-fluorenol ester (Component C, specifically component IVb).

The resulting memory composition changed colour from turquoise to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 2.8 microns changed colour from turquoise to colourless

Example 6

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorenol ester (Component C, specifically component IVc) as shown below):

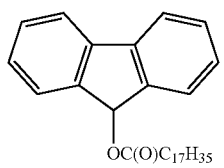

(IVc)

The resulting memory composition changed colour from Magenta to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns changed colour from Magenta to colourless

Example 7

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorenol ester (Component C, specifically component IVd) as shown below):

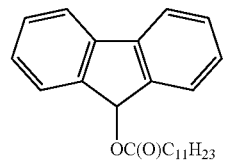

(IVd)

The resulting memory composition changed colour from Magenta to colourless. The colour change memory composition was heated above 55 C. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above 55 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns.

Example 8

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 74 parts of 9-fluorenol ester component IVa and 345 parts of component IVb (both Component C).

The resulting memory composition changed colour from Magenta to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns.

Example 9

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorene carboxylic acid ester component Va (Component C).

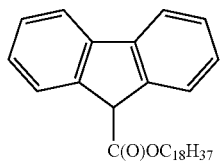

(Va)

C(O)OC$_{18}$H$_{37}$

The resulting memory composition changed colour from Magenta to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns.

Example 10

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorene carboxylic acid ester component Vb (Component C).

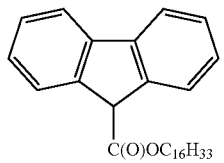

(Vb)

C(O)OC$_{16}$H$_{33}$

The resulting memory composition changed colour from Magenta to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns.

Example 11

A colour change memory composition was obtained by homogeneously compatibilizing: 26 parts of 3,3-bis(2-ethoxy-4-N,N-diethylaminophenyl)-7(4)-azaphthalide (component A) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 419 parts of 9-fluorene carboxylic acid ester component Vb (Component C).

The resulting memory composition changed colour from Turquoise to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

The resulting dispersion was then drum dried and the pigment was isolated in encapsulated form, the colour change memory pigment having a particle size of 4 microns.

Example 12

A colour change memory composition was obtained by homogeneously compatibilizing: 26 parts of 3,3-bis(1-n-butyl-2-methylindol-3-yl)phthalide (component A)) available from Yamamoto Chemicals and 30 parts 4,4'-(1-phenylethyllidene)bisphenol and 25 parts of 1,1'-bis(4-hydroxyphenyl)cyclohexane (both components B)) available from Sigma Aldrich and 377 parts of 9-fluorenol ester component Va and 42 parts of component Vb (both Component C).

The resulting memory composition changed colour from Magenta to colourless. The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours. The resulting dispersion was then drum dried and the pigment was isolated in encapsulated form, the colour change memory pigment having a particle size of 4 microns.

Example 13

A colour change memory composition was obtained by homogeneously compatibilizing:

5 parts of 3-(4-diethylamino-2-hexyloxyphenyl)-3-(1-ethyl-2-methylindol-3-yl)-4-azaphthalide (component A) available from Yamada Chemicals and 12 parts 2,2-bis(4'-hydroxyphenyl)hexafluoropropane and 8 parts of stearyl gallate (both components B) available from Sigma Aldrich and 175 parts of 9-fluorenol ester (Component C, specifically component IVb).

The resulting memory composition changed colour from blue to colourless.

The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

Some of the resulting dispersion was then drum dried and the pigment in encapsulated form was isolated, the colour change memory pigment having a particle size of 4 microns changed colour from blue to colourless.

Example 14

A colour change memory composition was obtained by homogeneously compatibilizing:

8 parts of 3-(4-diethylamino-2-hexyloxyphenyl)-3-(1-ethyl-2-methylindol-3-yl)-4-azaphthalide (component A) available from Yamada Chemicals and 6 parts 2,2-bis(4'-hydroxyphenyl)hexafluoropropane and 14 parts of 2,2-Bis(4-hydroxy-3-methylphenyl)propane,4,4'-Isopropylidenedi-o-cresol (both components B) available from Sigma Aldrich and 172 parts of 9-fluorenol ester (Component C, specifically component IVb).

The resulting memory composition changed colour from blue to colourless.

The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

Some of the resulting dispersion was then drum dried and the pigment in encapsulated form was isolated, the colour change memory pigment having a particle size of 4 microns changed colour from blue to colourless.

Example 15

A colour change memory composition was obtained by homogeneously compatibilizing:

8 parts of 3-(4-diethylamino-2-hexyloxyphenyl)-3-(1-ethyl-2-methylindol-3-yl)-4-azaphthalide (component A) available from Yamada Chemicals and 8 parts 2,2-bis(4'-hydroxyphenyl)hexafluoropropane and 12 parts of 2,2-Bis(4-hydroxy-3-methylphenyl)propane,4,4'-Isopropylidenedi-o-cresol (both components B) available from Sigma Aldrich and 172 parts of 9-fluorenol ester (Component C, specifically component IVa).

The resulting memory composition changed colour from blue to colourless.

The colour change memory composition was heated above T4. 100 parts of the hot colour change memory composition was then dispersed into 100 parts of a 10% solution of methyl vinyl ether-maleic anhydride copolymerized resin neutralised with sodium hydroxide to pH 4 by means of a high speed homogeniser. The resulting emulsion was maintained at temperature above T4 and slowly added 25 parts of a solution of melamine formaldehyde resin. The resulting emulsion was stirred and heated to a temperature of 80° C. for 6 hours.

Some of the resulting dispersion was then drum dried and the pigment in encapsulated form was isolated, the colour change memory pigment having a particle size of 4 microns changed colour from blue to colourless.

Preparation of the Measuring Samples 10 parts of the colour change memory composition of the water dispersion obtained in Example 1 in encapsulated form were dispersed in 10 parts of a polyvinyl alcohol solution was screen printed onto sheet of copy paper, thereby obtaining a test sample.

The same method has been carried out in order to obtain a test sample for the colour change memory composition of Examples 2 to 15 in encapsulated form.

Each of the test samples was heated and cooled by the below described method. The measuring sample thus prepared was set on a predetermined position of a Linkam (manufactured by Linkam, UK) and the colour density at each temperature was measured by heating and cooling with a temperature width of 100° C.

For example, in the case of Example 1, the sample was heated up to 100° C. a measurement starting temperature of 20° C., and then cooled to −20° C. The brightness of the colour displayed at each temperature was measured and each of $T_1$, T2, T3, $T_4$, and ΔH was obtained.

The results of the temperature analysis in ° C. of the microcapsules is reported below as per their temperature of full clearing (T4) and temperature of full colour return (T1) as well as practical hysteresis ΔH. The results are reported below for the various examples are reported in the table below.

| Examples | T1 (° C.) | T2 (° C.) | T3 (° C.) | T4 (° C.) | $\Delta H_{T3-T2}$ (° C.) |
|---|---|---|---|---|---|
| Example 1 | Below −30 | 0 | 43 | 66 | 43 |
| Example 2 | Below −30 | 9 | 44 | 66 | 35 |
| Example 3 | −20 | 20 | 40 | 68 | 20 |
| Example 4 | −15 | 20 | 51 | 73 | 31 |
| Example 5 | −15 | 30 | 47 | 75 | 17 |
| Example 6 | 21 | 27 | 42 | 70° C. | 15 |
| Example 7 | Below −20 | Below −20 | Below −20 | below −20 | N/A |
| Example 8 | −12 | 0 | 45 | 65 | 45 |
| Example 9 | 0 | 10 | 31 | 70 | 21 |
| Example 10 | −20 | 5 | 25 | 52 | 20 |
| Example 11 | −12 | 0 | 22 | 50 | 22 |
| Example 12 | 1 | 15 | 30 | 70 | 15 |
| Example 13 | −7 | 10 | 56 | 70 | 46 |
| Example 14 | −12 | 9 | 52 | 70 | 43 |
| Example 15 | −30 | 10 | 53 | 64 | 43 |

Comparative Example 16

An aqueous water based flexo ink was prepared using Kromagen Concentrate K60-NH Magenta, a permanent colour change water based ink concentrate sold by TMC Hallcrest which permanently changes colour above 60 C from colourless to Magenta, an acrylic water based flexo binder sold by TMC Hallcrest under the trade name Kromagen W/B Flexo Binder. The Kromagen W/B flexo binder is used as an extender to allow Kromagen Concentrate K60-NH Magenta to be converted into a flexographic printing ink. The ink was prepared by hand mixing 5 parts of Kromagen Concentrate K60-NH Magenta with 5 parts Kromagen W/B Flexo Binder to make 10 parts of ink. A portion of white paper was printed using a K 101 control coater (RK Printcoat instrument using a wired K bar #1 leaving a thin film deposit of 6 microns on the paper. The printed piece of paper was dried at 20 C. The colour of the resulting printing paper was white. On heating, the paper changed colour permanently from white to magenta at a temperature above 60° C. On cooling below 60° C., the magenta colour is retained. This Example demonstrates the irreversible colour-change of the Kromagen ink, specifically, that the inks remain magenta in colour irrespective of the temperature provided it has been previously subjected to a temperature of at least 60° C.

Example 17

A composition containing the following components was prepared by hand-mixing:

| | |
|---|---|
| Kromagen Concentrate K60-NH Magenta | 4 parts |
| Kromagen W/B Flexo Binder | 4 parts |
| Thermochromic dispersion of Example 14 | 2 parts |

The ink was printed onto white paper with K 101 bar coated using bar #1. The print was ait dried at 20° C., between T2 and T3 of the component of Example 14. The resulting white print was then cut in 2 pieces (piece #1 and piece #2).

Piece #1 was heated to 70° C., above T4 of the composition of Example 14. On cooling the print to 20° C., a magenta colour is observed as a result of the permanent colour change of the Kromagen part of the ink. The same piece was then cooled to -20 C, below the temperature T1 of the memory composition Example 14 and then returned to ambient temperature. The composition of Example 14 was activated at low temperature to provide a blue colour, which, with the magenta of the permanent ink, combine to provide a purple colour at ambient temperature. On heating the piece to 70° C. again, the blue colour cleared such that the piece showed the magenta coloured print at 70° C. and as the temperature returned to ambient. This colour progression is shown in FIG. 4a Example 18

Piece #2 from Example 17 was cooled to -20 C, below T1 of the Composition of Example 14, in a freezer resulting in a blue coloured piece as the blue colour from the memory composition component of the ink was activated. The resulting blue coloured print is then heated to +65° C., above 60° C. and above T3 of the Composition of Example 14, the activation temperature of the Kromagen component and below +70 C, the temperature T4 of the memory composition Example 14, providing magenta with the blue colour giving a purple colour. The print was cooled to room temperature of 20° C. and a print with a purple colour is obtained. The Kromagen magenta part of the ink system is activated and the blue colour of the memory composition is present, resulting in a purple colour. When heated above 70° C. and brought back to room temperature of 20° C., the permanent magenta colour from the Kromagen part of the ink system was retained when the blue colour from the memory composition is now cleared. This colour progression is shown in FIG. 4b By observing the colour of the Piece #1 and Piece #2, it is possible to determine whether it has been subjected to a temperature change below or above T1 and T4 of the Composition of Example 14. If it has not, the Piece remains white. If subjected to a temperature below T1 but not above T4, the blue colour of the Composition of Example 14 is observed, if the Piece has been subjected to a Temperature above 60° C., the irreversible colour of magenta or, in the case of also being cooled below T1, magenta with blue giving purple is observed. In this way, the Piece provides a visual indication of the temperature cycling history of Piece #1 such that it may be used as an indicator in a wide range of applications where detection of a temperature change beyond defined limits is required.

In the conditions of the test in Examples 17 and 18, the temperature cycling means that the initial white colour cannot be obtained once the Piece has been heated to over the colour change temperature of the permanent ink or below the T1 colour change temperature of the reversible ink. White i.e. a colourless composition, could only be obtained if the Composition of Example 14 was taken to a temperature above 70 However, the presence of the permanent ink, which irreversibly changes colour to magenta below T4 (70° C.) of the reversible composition means that magenta will also always be present in the conditions required to return the composition to colourless. The combination of inks provides a temperature indicator for temperatures below T1 and above the activation temperature of the permanent Kromagen ink.

Example 19

An aqueous ink gel composition according to the invention for use in a writing instrument was prepared and contained (1) a coloring material, (2) a viscosity control agent (3) a mixture of water soluble organic solvents (4) a preservative (5) a pH modifier and (6) water as set out below:

| | |
|---|---|
| (2) Thermochromic composition according to the invention as a water based dispersion | 45.0% by weight |
| (2) 2.0% solution of Rheozan (Solvay SA) | 30% by weight |
| (3) propylene glycol | 15.0% by weight |
| (3) glycerin | 5.0% by weight |
| (4) Proxel ® XL2 by Lonza is an aqueous propylene glycol solution of 1,2-benzisothiazolin-3-one, a preservative | 0.2% by weight |
| (5) Aminomethylpropanol | 0.3% by weight |
| (6) demineralized water | 4.5% by weight |

The ink composition was loaded in a writing instrument and provided a writing ink having excellent flow characteristics and on being left to rest, the ink at the tip of the pen did not dry out.

The invention claimed is:
1. A colour change composition comprising: A) an electron donating organic colouring compound, B) an electron accepting compound and C) a compound of formula (IV):

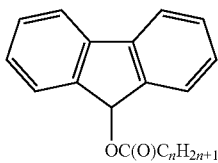

wherein n is from 4 to 22.

2. The colour change composition of claim 1 further comprising a modifier compound D) selected from a fatty ester, a fatty alcohol and a wax.

3. The colour change composition of claim 1 comprising two or more compounds C).

4. The colour change composition of claim 1 which has a hysteresis range from 10 to 80° C.

5. The colour change composition of claim 1 which has a fully coloured or decoloured temperature T4 higher than ambient temperature and, respectively, a fully decolored or coloured temperature T1 lower than 20° C.

6. The colour change composition of claim 1 further comprising a colour change product which irreversibly changes colour at a temperature which is below the T4 temperature of the colour change composition.

7. The colour change composition of claim 6, wherein the colour change product is in the form of a microencapsulated pigment.

8. A compound of formula (IV):

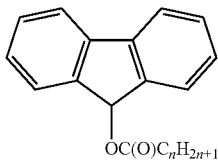

wherein n is from 4 to 22.

9. The compound of claim 8, wherein the compound is selected from a compound of formula (IVa), (IVb), (IVc) and (IVd) as shown below:

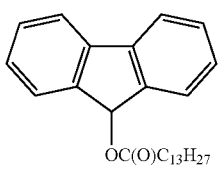

(IVa)

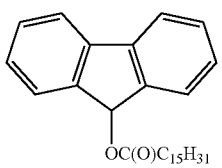

(IVb)

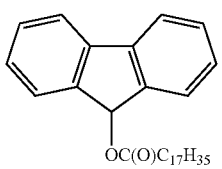

(IVc)

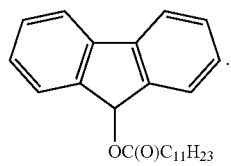

(IVd)

10. A method of effecting colour change in, or in combination with, a toy, printed material, decoration, writing instrument, temperature indicator packaging of temperature-sensitive products or in an industrial application comprising:
combining a colour change composition including: A) an electron donating organic colouring compound, B) an electron accepting compound, and C) a compound of formula (IV):

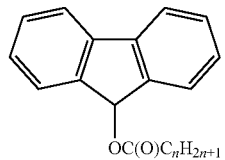

wherein n is from 4 to 22;
with the toy, printed material, decoration, writing instrument, temperature indicator packaging of temperature-sensitive product or industrial application employing the composition.

11. The colour change composition of claim 1 for use in an ink composition for a writing implement.

12. The colour change composition of claim 11, wherein the writing implement is adapted to receive a charge of the ink composition.

13. An indicator comprising a first colour change composition, the first colour change composition comprising: A) an electron donating organic colouring compound, B) an electron accepting compound, and C) a compound of formula (IV):

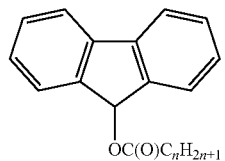

wherein n is from 4 to 22.

14. The indicator of claim 13 further comprising a second composition selected from:
  i. an irreversible colour change ink capable or irreversibly changing colour at a specified temperature $T_{irrev}$;
  ii. a second colour-change composition in its higher temperature state and wherein the first colour-change composition is in its lower temperature state; and
  iii. a mixture of i) and ii).

15. The indicator of claim 14 comprising:
  i) a second colour change composition wherein
    a) the first colour change composition and the second colour change composition are disposed on a surface in the same area providing a single indicator or
    b) the first colour change composition and the second colour change composition are disposed on a surface in separate areas providing two separate indicators.

16. A color change composition comprising: A) an electron donating organic coloring compound, B) an electron accepting compound, and C) a compound of formula (IV):

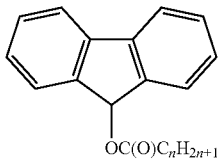

wherein n is from 4 to 22.

17. The color change composition of claim 16, further comprising a modifier compound D) selected from a fatty ester, a fatty alcohol, and a wax.

18. The color change composition of claim 16 comprising two or more compounds C).

19. The color change composition of claim 16, which has a hysteresis range from 10 to 80° C.

20. The color change composition of claim 16, which has a fully colored or decolored temperature T4 higher than ambient temperature and, respectively, a fully decolored or colored temperature T1 lower than 20° C.

21. The color change composition of claim 16 further comprising a color change product which irreversibly changes color at a temperature which is below T4 temperature of the color change composition.

22. The color change composition of claim 21, wherein the color change product is in the form of a microencapsulated pigment.

23. The compound of claim 8, wherein n is from 4 to 18.

24. The compound of claim 8, wherein n is from 9 to 18.

* * * * *